US012165508B2

(12) United States Patent
Takahashi (10) Patent No.: US 12,165,508 B2
(45) Date of Patent: *Dec. 10, 2024

(54) HELMET WEARING DETERMINATION METHOD, HELMET WEARING DETERMINATION SYSTEM, HELMET WEARING DETERMINATION APPARATUS, AND PROGRAM

(71) Applicant: NEC Corporation, Tokyo (JP)

(72) Inventor: Katsuhiko Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,000

(22) Filed: Oct. 5, 2023

(65) Prior Publication Data

US 2024/0029557 A1 Jan. 25, 2024

Related U.S. Application Data

(63) Continuation of application No. 17/226,316, filed on Apr. 9, 2021, now Pat. No. 11,816,983, which is a (Continued)

(30) Foreign Application Priority Data

Nov. 20, 2013 (JP) ................................. 2013-239598

(51) Int. Cl.
*G08G 1/015* (2006.01)
*A42B 3/04* (2006.01)
(Continued)

(52) U.S. Cl.
CPC ........... *G08G 1/015* (2013.01); *A42B 3/0466* (2013.01); *G06F 18/22* (2023.01); *G06F 18/24* (2023.01);
(Continued)

(58) Field of Classification Search
CPC ........ G08G 1/015; G08G 1/04; A42B 3/0466; G06F 18/22; G06F 18/24; G06T 7/20;
(Continued)

(56) References Cited

U.S. PATENT DOCUMENTS 8,331,621 B1 12/2012 Allen et al.
10,679,078 B2 * 6/2020 Takahashi ................ G08G 1/04
(Continued)

FOREIGN PATENT DOCUMENTS

CN 103324909 A 9/2013 ............. G06F 21/32
CN 104200668 A 12/2014
(Continued)

OTHER PUBLICATIONS

Silva, Romuere, et al. "Automatic detection of motorcyclists without helmet." 2013 XXXIX Latin american computing conference (CLEI). IEEE, 2013. (Year: 2013).*
(Continued)

*Primary Examiner* — Pinalben Patel (57) ABSTRACT

The present invention is directed to a helmet wearing determination system including a imaging means that is installed in a predetermined position and images a two-wheel vehicle that travels on a road; and a helmet wearing determination means that processes an image imaged by the imaging means, estimates a rider head region corresponding to a head of a person who rides on the two-wheel vehicle that travels on the road, compares image characteristics of the rider head region with image characteristics according to the head at a time when a helmet is worn or/and at a time when a helmet is not worn, and determines whether or not the rider wears the helmet.

15 Claims, 7 Drawing Sheets

Related U.S. Application Data continuation of application No. 15/037,875, filed as application No. PCT/JP2014/079825 on Nov. 11, 2014, now Pat. No. 11,003,929.

(51) Int. Cl.

| | | |
|---|---|---|
| *G06F 18/22* | (2023.01) | |
| *G06F 18/24* | (2023.01) | |
| *G06T 7/20* | (2017.01) | |
| *G06V 10/44* | (2022.01) | |
| *G06V 20/59* | (2022.01) | |
| *G06V 40/10* | (2022.01) | |
| *G06V 40/20* | (2022.01) | |
| *G08G 1/04* | (2006.01) | |

(52) U.S. Cl.
CPC ............... *G06T 7/20* (2013.01); *G06V 10/44* (2022.01); *G06V 20/59* (2022.01); *G06V 40/10* (2022.01); *G06V 40/20* (2022.01); *G08G 1/04* (2013.01); *G06T 2207/30248* (2013.01); *G06V 20/597* (2022.01)

(58) Field of Classification Search
CPC .......... G06T 2207/30248; G06V 10/44; G06V 20/59; G06V 40/10; G06V 40/20; G06V 20/597
See application file for complete search history.

(56) References Cited

U.S. PATENT DOCUMENTS

| | | | |
|---|---|---|---|
| 2005/0169367 A1 | 8/2005 | Venetianer et al. | |
| 2006/0251338 A1 | 11/2006 | Gokturk | G06F 16/583 707/E17.022 |
| 2008/0234899 A1 | 9/2008 | Breed | B60R 21/01516 701/1 |
| 2009/0202145 A1 | 8/2009 | Yokono et al. | |
| 2011/0081052 A1 | 4/2011 | Bigioi | G06V 10/44 382/118 |
| 2011/0123071 A1 | 5/2011 | Shah | G06K 9/6219 382/118 |
| 2012/0163657 A1 | 6/2012 | Shellshear | |
| 2013/0141576 A1 | 6/2013 | Lord et al. | |
| 2014/0358329 A1 | 12/2014 | Morishima et al. | |
| 2018/0137754 A1 | 5/2018 | Alon | |
| 2021/0274875 A1 | 9/2021 | Glenn | A42B 3/0466 |

FOREIGN PATENT DOCUMENTS

| | | |
|---|---|---|
| JP | 64-37699 A | 2/1989 |
| JP | 2009-140283 A | 6/2009 |
| JP | 2009-180124 A | 8/2009 |
| JP | 2010-211427 A | 9/2010 |
| JP | 2012-212967 A | 11/2012 |
| JP | 2012-243155 A | 12/2012 |
| KR | 10-1936629 B1 | 1/2019 |
| WO | 2015/076151 A1 | 5/2015 |

OTHER PUBLICATIONS

International Search Report and Written Opinion mailed Feb. 3, 2015, in corresponding PCT International Application.

Jinfeng Yan: et al.: "An Adaptive Bicycle Detection Algorithm Based on Multi-Gaussian Models", Journal of Computational Information Systems 9.25 (2013), pp. 10075-10083.

Non-final Office Action dated Jul. 25, 2019, issued in co-pending U.S. Appl. No. 16/376,530.

Office Action issued Apr. 1, 2020, by the Japanese Patent Office in counterpart Japanese Patent Application No. 2019-071796.

J. Chiverton, "Helmet presence classification with motorcycle detection and tracking", IET Intelligent Transport Systems, Sep. 2012.

Desai, Maharsh, "Automatic Helmet Detection on Public Roads", International Journal of Engineering Trends and Technology (IJETT)—vol. 35 No. 5—May 2016.

Waranusast, Rattapoom, et al. "Machine vision techniques for motorcycle safety helmet detection." Image and Vision Computing New Zealand (IVCNZ), 2013 28th International Conference of. IEEE, 2013.

Sutikno, Sutikno, et al. "Classification of Motorcyclists not Wear Helmet on Digital Image with Backpropagation Neural Network." TELKOMNIKA (Telecommunication Computing Electronics and Control) 14.3 (2016): 11281133.

Wen, Che-Yen. "The safety helmet detection technology and its application to the surveillance system." Journal of Forensic Science 49.4 (2004): 1-11.

Silva, Romuere, et al. "Automatic detection of motorcyclists without helmet." Computing Conference (CLEI), 2013 XXXIX Latin American. IEEE, 2013.

Final Office Action dated Jul. 8, 2019, issued by the U.S. Patent Office in co-pending U.S. Appl. No. 15/037,875.

Notice of Allowance dated Feb. 4, 2020, issued in counterpart U.S. Appl. No. 16/376,530.

Japanese Office Action for JP Application No. 2020-213274 mailed on Dec. 15, 2021 with English Translation.

JP Office Action for JP Application No. 2022-114800, mailed on May 16, 2023 with English Translation.

\* cited by examiner

SPECIFY BIKE FROM CIRCULAR CONTOUR AND
SPECIFY VEHICLE BODY

FULL-FACE TYPE

JET TYPE

CAP TYPE

WHEN HELMET IS NOT WORN

FIG. 8

HELMET WEARING DETERMINATION METHOD, HELMET WEARING DETERMINATION SYSTEM, HELMET WEARING DETERMINATION APPARATUS, AND PROGRAM

CROSS-REFERENCE TO RELATED APPLICATIONS

The present application is a continuation application of U.S. patent application Ser. No. 17/226,316 filed on Apr. 9, 2021, which is a continuation application of U.S. patent application Ser. No. 15/037,875 filed on May 19, 2016, which issued as U.S. Pat. No. 11,003,929, which is a National Stage Entry of international application PCT/JP2014/079825, filed Nov. 11, 2014, which claims the benefit of priority from Japanese Patent Application 2013-239598 filed on Nov. 20, 2013, the disclosures of all of which are incorporated in their entirety by reference herein.

TECHNICAL FIELD

The present invention relates to a helmet wearing determination method, a helmet wearing determination system, a helmet wearing determination apparatus, and a program.

BACKGROUND ART

Recently, from a standpoint of security, a technology for monitoring a mobile object such as an automobile that travels on a road is proposed. Further, the technology is a technology for determining and detecting whether a mobile object that travels on a road is any one of an automobile (four-wheel vehicle), a bike (two-wheel vehicle), a bicycle (two-wheel vehicle), and a pedestrian.

In particular, from a standpoint of safety and illegality, whether a person who rides on the two-wheel vehicle wears a helmet is expected to be detected.

To cope with the above, a technology for detecting whether the person who rides on the two-wheel vehicle wears the helmet is proposed (for example, see Patent Literature 1).

In the invention of Patent Literature 1, an image processing unit processes an image produced from a camera and detects an imaged person. When the person is detected, the image processing unit determines whether the person wears the helmet. In a determination method, a face and a head of a person are first detected and on the basis of a ratio between a width of the face and a width of the head, it is determined whether the helmet is worn.

CITATION LIST

Patent Literature

Patent Literature 1: Japanese Laid-open Patent Publication No. 2010-211427

SUMMARY OF INVENTION

Technical Problem

However, in the invention of Patent Literature 1, image processing for detecting a face and a head of a person is required. When a type of a helmet, for example, a full-face type or jet type helmet is worn, a face is hidden in the helmet and it is difficult to detect the face. Further, suppose that on the basis of a ratio between a width of a face and a width of a head, it is determined whether or not the helmet is worn. In the case where the helmet is not worn and in the case where a full-face type helmet is worn, both of the ratios between the widths of the faces and the widths of the heads of the person are approximately equal to one, and therefore it is difficult to determine whether or not the helmet is worn.

The present invention is made to solve the above problem. Therefore, the purpose of the present invention is to provide a helmet wearing determination method, a helmet wearing determination system, a helmet wearing determination apparatus, and a program capable of detecting with high accuracy whether or not a person who rides on a two-wheel vehicle wears the helmet.

Solution to Problem

The present invention is directed to a helmet wearing determination system including a imaging means that is installed in a predetermined position and images a two-wheel vehicle that travels on a road; and a helmet wearing determination means that processes an image imaged by the imaging means, estimates a rider head region corresponding to a head of a person who rides on the two-wheel vehicle that travels on the road, compares image characteristics of the rider head region with image characteristics according to the head at a time when a helmet is worn or/and at a time when a helmet is not worn, and determines whether or not the rider wears the helmet.

The present invention is directed to a helmet wearing determination method including the steps of processing an image of an imaging device that images a road, estimating a rider head region corresponding to a head of a person who rides on a two-wheel vehicle that travels on the road, comparing image characteristics extracted from the rider head region with image characteristics according to the head at a time when a helmet is worn or/and at a time when a helmet is not worn, and determining whether or not the rider wears the helmet.

The present invention is directed to a helmet wearing determination apparatus including a helmet wearing determination means that processes an image of an imaging device that images a road, estimates a rider head region corresponding to a head of a person who rides on a two-wheel vehicle that travels on the road, compares image characteristics of the rider head region with image characteristics according to the head at a time when a helmet is worn or/and at a time when a helmet is not worn, and determines whether or not the rider wears the helmet.

The present invention is directed to a program for causing a computer to execute a process of processing an image of an imaging device that images a road and estimating a rider head region corresponding to a head of a person who rides on a two-wheel vehicle that travels on the road; and a process of comparing image characteristics of the rider head region with image characteristics according to the head at a time when a helmet is worn or/and at a time when a helmet is not worn and determining whether or not the rider wears the helmet.

Advantageous Effects of Invention

According to the present invention, on the basis of image of the two-wheel vehicle that travels on the road, it can be detected with high accuracy whether or not the person who rides on the two-wheel vehicle wears the helmet.

BRIEF DESCRIPTION OF DRAWINGS

FIG. 2 illustrates the present invention.

DESCRIPTION OF EMBODIMENTS

An embodiment of the present invention will be described with reference to the accompanying drawings.

Figure 1:
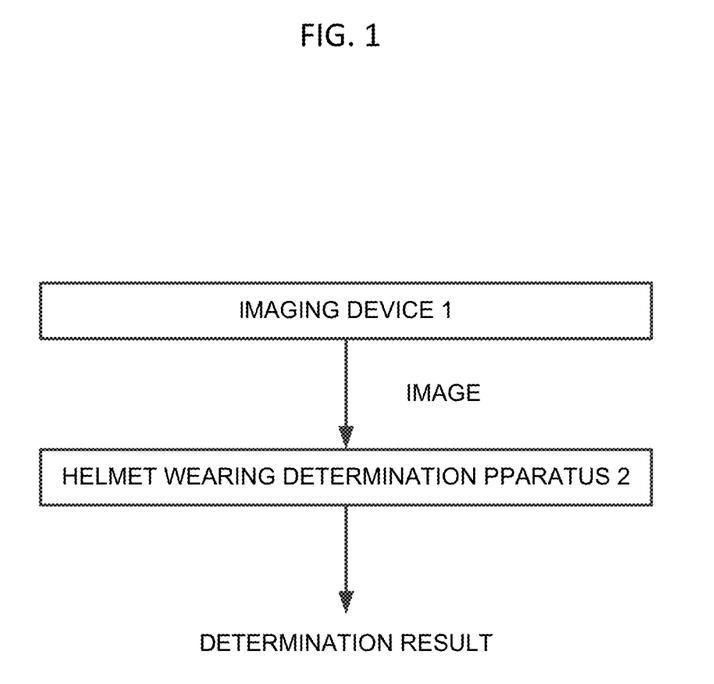
FIG. 1 is a block diagram illustrating a concept of the present invention.

First, a concept of the present invention will be described. FIG. 1 is a block diagram illustrating the concept of the present invention. In FIG. 1, a reference numeral 1 denotes an imaging device, and a reference numeral 2 denotes a helmet wearing determination apparatus.

The imaging device 1 is installed in a predetermined position on a lateral side of a road on which a two-wheel vehicle travels, and images the two-wheel vehicle that travels on the road. In addition, the two-wheel vehicle travels is, for example, motor cycle such as bikes, a bicycle, etc.

The helmet wearing determination apparatus 2 processes an image of the imaging device 1 and estimates a rider head region corresponding to a head of a person who rides on the two-wheel vehicle that travels on the road. Further, the helmet wearing determination apparatus 2 compares image characteristics of the rider head region with image characteristics according to the head at the time when a helmet is worn or/and at the time when a helmet is not worn, and determines whether or not a rider wears the helmet.

In particular, the present invention is characterized in that the image characteristics of the head (the entire shape including the head and a face) at the time when a person wears a helmet and the image characteristics of the head (the entire shape including the head and the face) at the time when a person does not wear a helmet each have unique image characteristics, and by using the above, the present invention determines whether or not the person who rides on the two-wheel vehicle wears the helmet.

Like a conventional technology, by using the above-described characteristics, the present invention can determine whether or not a person who rides on the two-wheel vehicle wears the helmet, without necessity to recognize a face of the person who rides on the two-wheel vehicle.

Next, operations of the helmet wearing determination apparatus 2 will be described with reference to FIG. 2.

Figure 2:
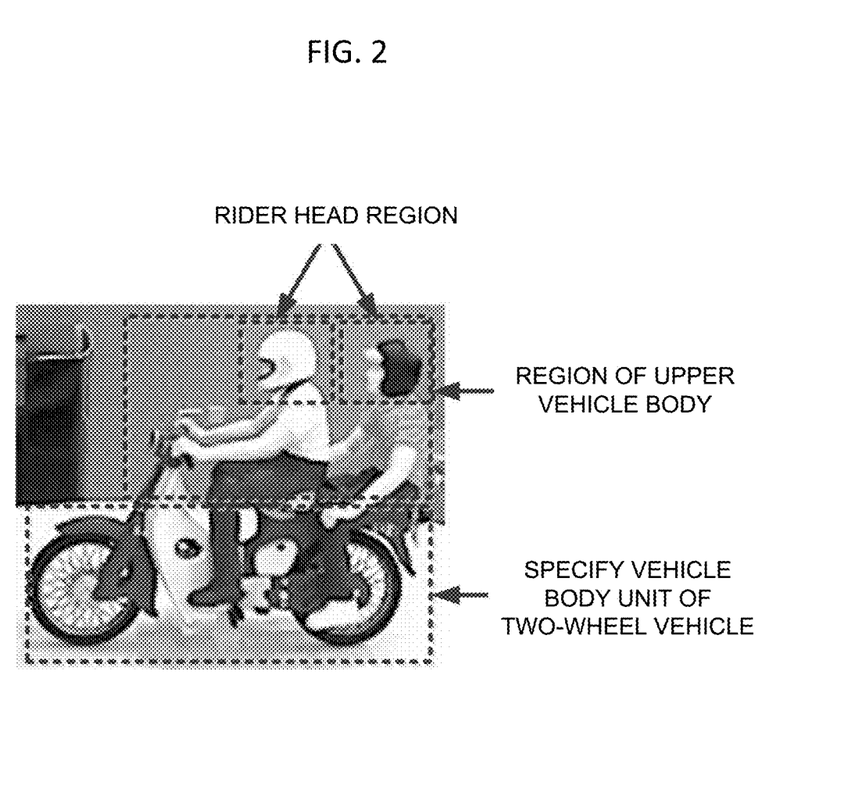

As illustrated in FIG. 2, an image in a region in the upper position of the two-wheel vehicle is first extracted from the image imaged by the imaging device 1. As an extraction method, the entire image in which a driver rides on the two-wheel vehicle is extracted, and then the image in the region in the range of a predetermined upper position is taken out from the entire image. Alternatively, from the entire image in which the driver rides on the two-wheel vehicle, a vehicle body unit of the two-wheel vehicle may be specified, and the image in the region in the predetermined range of the upper vehicle body unit may be extracted.

Next, the rider head region corresponding to the head of the person who rides on the two-wheel vehicle is estimated from the extracted image in the upper region. The head of the person is a spherical body, and even if the helmet is worn, a contour of the head is circular to some extent, and further, the contour has not a shape in which an edge of the hump is pointed. When the shapes of the heads estimated to be the heads of the persons are previously learnt and a database of the head shapes is made, the rider head region corresponding to the head of the rider can be specified from the extracted region.

Further, the shapes according to the heads of the persons can be specified from shapes of valley portions of the image contour in the upper position. In the case where two persons ride on the two-wheel vehicle, for example, a peculiar valley portion formed by a line from a head and a back of a person who rides on a front seat of the two-wheel vehicle up to arms, a chest, and a head of a person who rides on a rear seat of the two-wheel vehicle is generated between the heads. Accordingly, when the peculiar shape of the valley portion is previously learnt and the database is made, the rider head region including the head can be specified from the contour shape in the upper position. Further, two methods as described above are combined, and thereby specific accuracy of the rider head region including the head can be improved more.

As described above, the rider head region corresponding to the head of the person who rides on the two-wheel vehicle is estimated.

Next, the image characteristics of the rider head region are compared with the image characteristics according to the head at the time when the helmet is worn or the image characteristics according to the head at the time when the helmet is not worn. The image of the head at the time when the helmet is worn has peculiar image characteristics. In a full-face type, jet type, or cap type helmet, for example, an image from a direction in which a face is imaged has peculiar characteristics at the time when their helmets are worn. On the other hand, also the image of the head at the time when the helmet is not worn has peculiar image characteristics. To cope with the above, the peculiar image characteristics of the image of the head at the time when the helmet is worn and the peculiar image characteristics of the image of the head at the time when the helmet is not worn are previously learnt and the database is made. By using the above database, the image characteristics of the rider head region are discriminated, and it is determined whether or not the rider wears the helmet.

Next, a specific embodiment of the present invention will be described.

Figure 3:
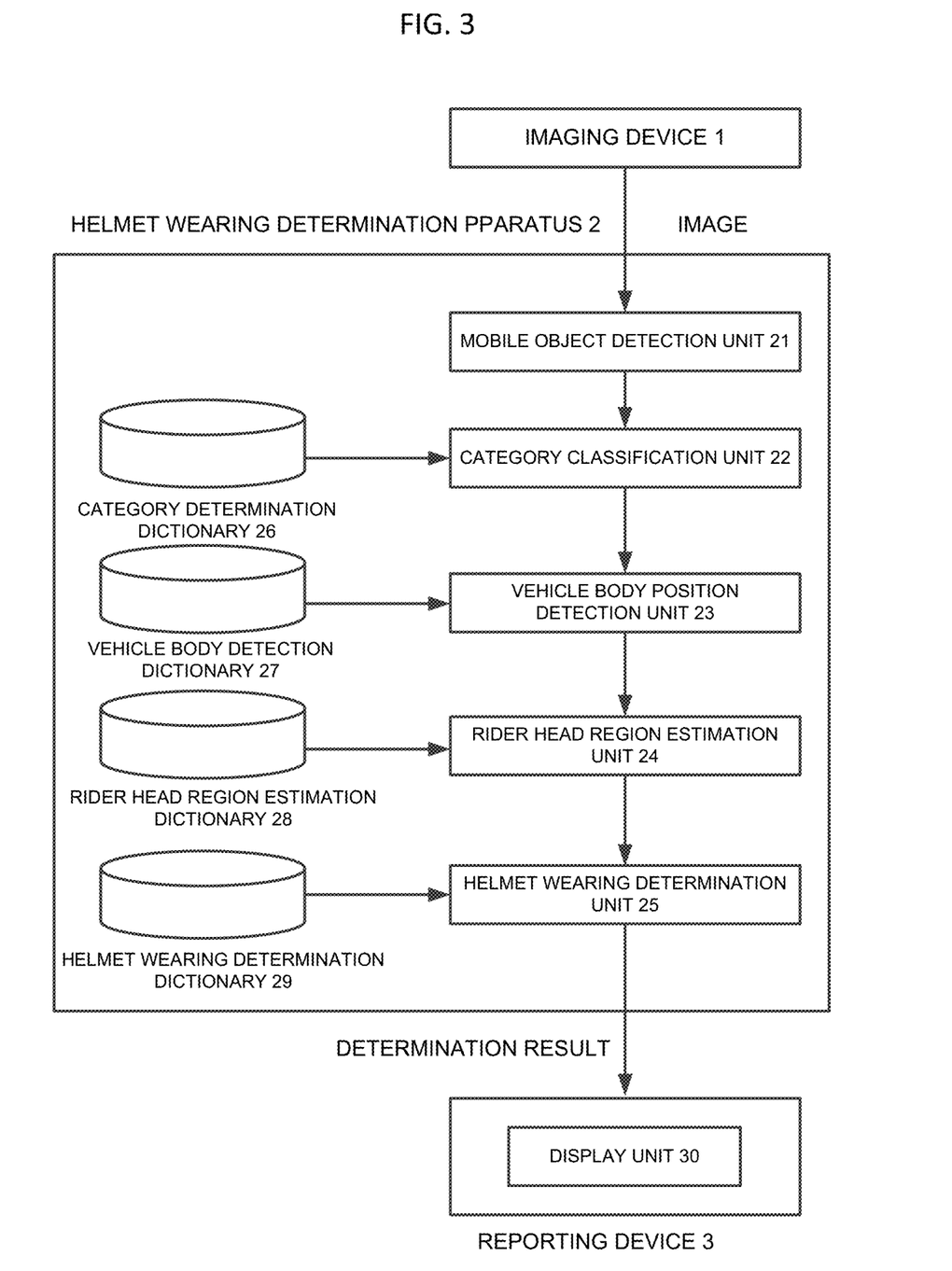
FIG. 3 is a block diagram illustrating a two-wheel vehicle riding person number determination system according to an embodiment of the present invention.

FIG. 3 is a block diagram illustrating a helmet wearing determination system according to the embodiment of the present invention.

The helmet wearing determination system according to the embodiment of the present invention includes the imaging device 1, the helmet wearing determination apparatus 2, and a reporting device 3.

The imaging device 1 images the two-wheel vehicle that travels on a road, and is installed in a position in which an image in which the above-described rider head region is easily detected can be imaged.

Figure 4:
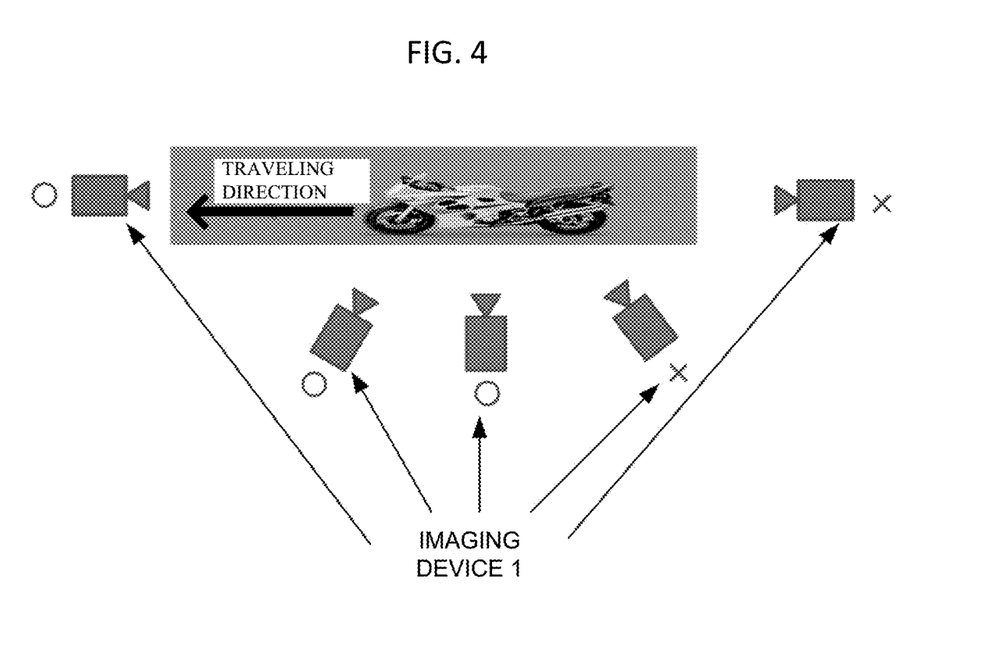
FIG. 4 illustrates an installation location of an imaging device 1.

Specifically, as illustrated in FIG. 4, in the range from a front face up to a lateral side (mainly, an obliquely front side) with respect to a traveling direction of the two-wheel vehicle, the imaging device 1 is installed in a position in which the two-wheel vehicle can be imaged. The helmet includes several types of full-face type, jet type, and cap type. Therefore, when the two-wheel vehicle is imaged from a direction in which a face of the person who rides on the two-wheel vehicle is imaged, a difference easily shows up between the case where the helmet is worn and the case where the helmet is not worn. Further, the imaging device 1 is preferably installed short of a spot in which the two-wheel vehicle decelerates, such as a traffic intersection, a temporary stop line, a curve, and a speed bump. The two-wheel vehicle is imaged short of the spot in which the two-wheel vehicle decelerates, and thereby an image in which a motion blur is small is easily acquired. As a result, characteristics can be easily extracted from the image and accuracy in the determination whether or not the helmet is worn can be improved.

The helmet wearing determination apparatus 2 includes a mobile object detection unit 21, a category classification unit 22, a vehicle body position detection unit 23, a rider head region estimation unit 24, a helmet wearing determination unit 25, a category determination dictionary 26, a vehicle body detection dictionary 27, a rider head region estimation dictionary 28, and a helmet wearing determination dictionary 29.

The mobile object detection unit 21 detects a mobile object that moves in an image from the imaging device 1. In a method for detecting the mobile object, various types of methods are conventionally proposed and an appropriate method may be selected.

The category classification unit 22 specifies the two-wheel vehicle (bike) from among the mobile objects by using the category determination dictionary 26, and supplies to the vehicle body position detection unit 23 the entire image of the two-wheel vehicle (bike) that moves. A database of information for specifying the two-wheel vehicle (bike) is made and registered in the category determination dictionary 26.

Specifically, the category classification unit 22 receives detection of the mobile objects from the mobile object detection unit 21, and classifies categories of the mobile objects. In the classification of the category of the mobile object, a size of a search range for discriminating the category of the mobile objects is previously determined and a probability that the mobile object is any mobile object other than the two-wheel vehicle is calculated on the basis of a characteristic amount in the search range. On the basis of the above results, any mobile object other than the two-wheel vehicle is excluded. In the predetermined search range, for example, characteristics that two circles are aligned approximately linearly can be used as characteristics for calculating the probability that the mobile object is any mobile object other than the two-wheel vehicle. Further, characteristics of positions of headlights or the number thereof can be used as characteristics for calculating the probability that the mobile object is any mobile object other than the two-wheel vehicle (bike). A characteristic portion of the image as described above is previously learnt and a database of the above data is made as the category determination dictionary 25. Further, by using the category determination dictionary 25, the category classification unit 22 determines a probability that the detected mobile object is any mobile object other than the two-wheel vehicle. In the case where this probability is more than a predetermined threshold, the category classification unit 22 prevents the entire image of the mobile object from being supplied to the vehicle body position detection unit 23. On the other hand, in the case where the probability is not more than the predetermined threshold, the category classification unit 22 supplies the entire image of the detected mobile object to the vehicle body position detection unit 23. By using the category determination dictionary 25, for example, the category classification unit 22 prevents the entire image of the detected mobile object that is determined to be any mobile object other than the two-wheel vehicle with the probability of 90% (=a predetermined threshold) from being supplied to the vehicle body position detection unit 23. On the other hand, since there is also the possibility that the mobile object that is determined to be any mobile object other than the two-wheel vehicle with the possibility of 90% or less, for example, 85% is the two-wheel vehicle, the category classification unit 22 supplies the entire image of the mobile object to the vehicle body position detection unit 23 to perform a detailed verification.

Figure 5:
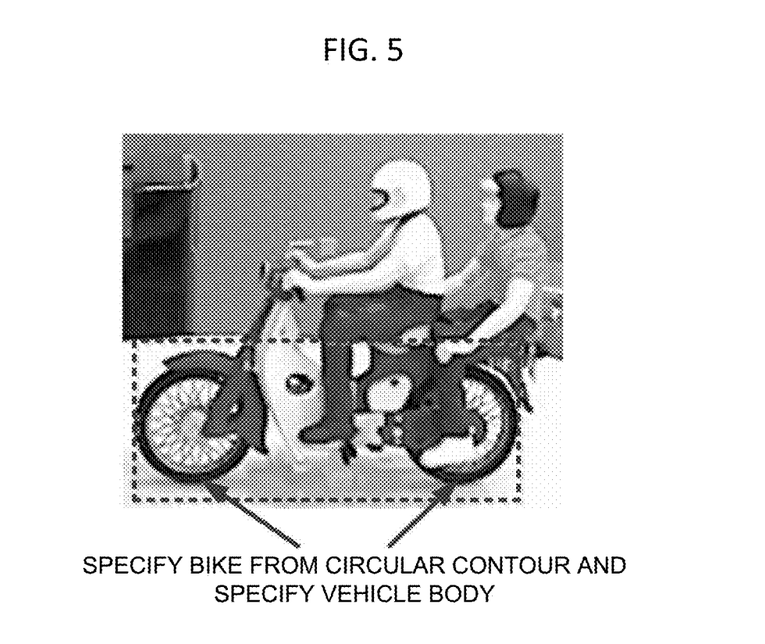
FIG. 5 illustrates the embodiment of the present invention.
Figure 6:
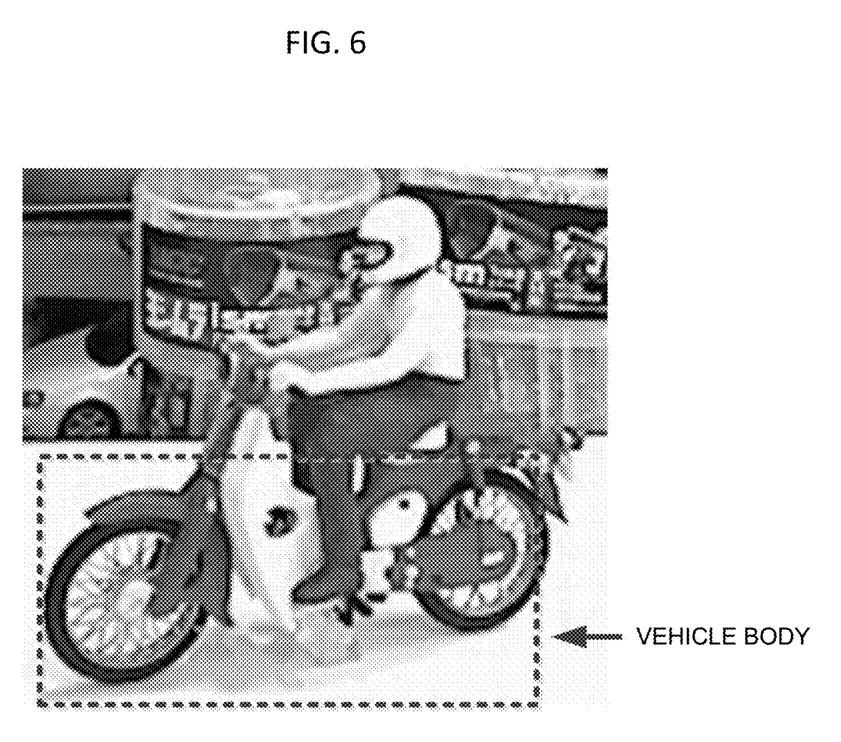
FIG. 6 illustrates the embodiment of the present invention.

On the basis of the entire image of the mobile object produced from the category classification unit 22, the vehicle body position detection unit 23 specifies a range according to the vehicle body unit of the two-wheel vehicle by using the vehicle body detection dictionary 26. In the specification of this range, for example, in an example (an image imaged from the lateral side) of the entire image of the two-wheel vehicle (bike) illustrated in FIG. 5, for example, a range in which a length between a front end on the lateral side of a front wheel and a rear end on the lateral side of a rear wheel of the two-wheel vehicle is set as a horizontal width and a length in a longitudinal direction of the wheel is set as a vertical width is specified as a range of the vehicle body unit. Further, in an example (an image imaged from the obliquely front side) of the entire image of the two-wheel vehicle (bike) illustrated in FIG. 6, a range in which a length between a front end on the lateral side of the front wheel and a rear end on the lateral side of the rear wheel of the two-wheel vehicle is set as a horizontal width, and that is slightly larger than a width between a front end on the upper side and a front end on the installation side of the front wheel and the rear wheel of the two-wheel vehicle is specified as a range of the vehicle body unit. A wheel shape and a distance between wheels of the two-wheel vehicle that is required to be specified are previously learnt and a database of the above data is made as the vehicle body detection dictionary 27.

In addition, only images of the two-wheel vehicle are not necessarily produced from the category classification unit 22. Therefore, the vehicle body position detection unit 23 cannot specify the vehicle body unit of the two-wheel vehicle by using the vehicle body detection dictionary 26 in some cases. In this case, on the premise that the mobile object is not the two-wheel vehicle, the mobile object is excluded from objects of processing.

From the upper region of the vehicle body specified by the vehicle body position detection unit 23, the rider head region estimation unit 24 detects the rider head region estimated to be the head of the rider. As a detection method, the contour shape according to the head of the person is detected from the contour shape of the image in the upper region of the vehicle body specified by the vehicle body position detection unit 23, and the predetermined-size region surrounding the contour shape is detected as the rider head region. The head of the person is a spherical body and even if the helmet is worn, a contour shape of the head is circular to some extent. By using the above characteristics, humped shapes having the above-described characteristics of the head of the person are previously learnt and registered in the rider head region estimation dictionary 28. In the case where two persons or more ride on the two-wheel vehicle, a peculiar valley portion formed by a line from a head and a back of a person that rides on a front seat of the two-wheel vehicle up to arms, a chest, and a head of a person that rides on a rear seat of the two-wheel vehicle is generated between the heads. Accordingly, when the peculiar shape of the valley portions is previously learnt and registered in the rider head region estimation dictionary 28, the rider head region including the head can be specified from the contour shape in the upper position. Further, two methods as described above are combined, and thereby specific accuracy of the rider head region including the head can be improved more.

Further, the helmet wearing determination unit 25 compares the image characteristics of the rider head region with the image characteristics according to the head at the time when the helmet is worn or the image characteristics according to the head at the time when the helmet is not worn, and determines whether or not the rider wears the helmet.

Figure 7:
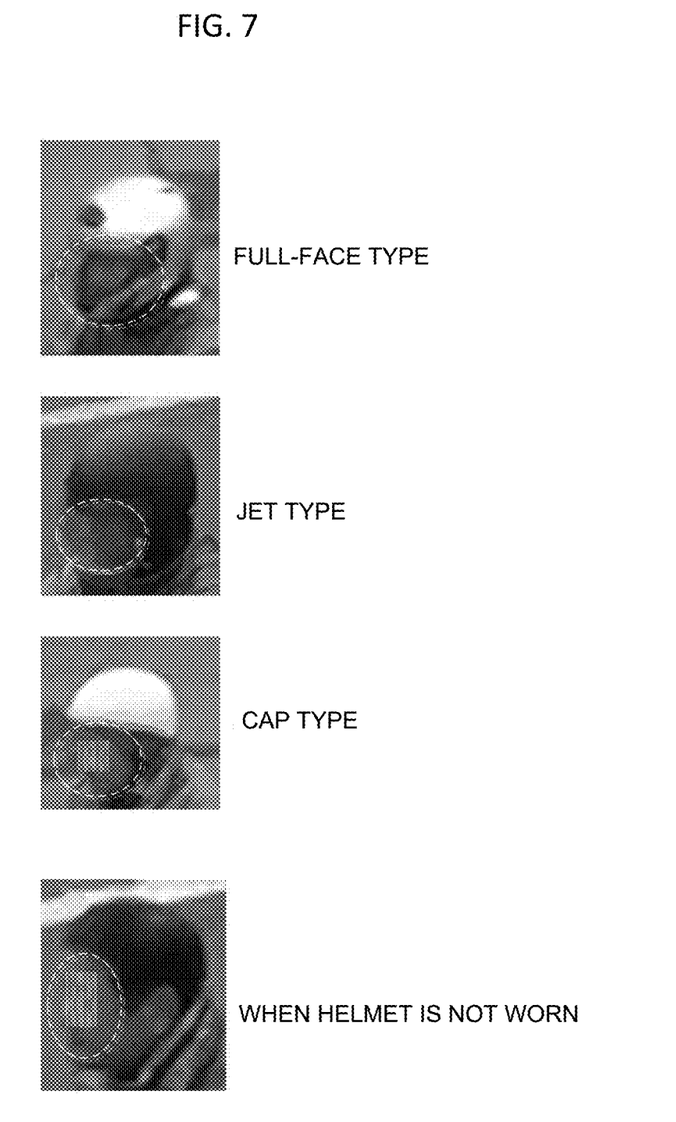
FIG. 7 illustrates the embodiment of the present invention.

For example, the image of the head of the rider who wears a full-face type, jet type, or cap type helmet has peculiar characteristics as illustrated in FIG. 7. On the other hand, also the image of the head of the rider at the time when the helmet is not worn has peculiar characteristics as illustrated in FIG. 7. As the peculiar characteristics as described above, the image of the head has, for example, a characteristic that a straight line is generated in a form crossing a face in a relatively upper portion of the central head at the time when the helmet is worn. Further, as another characteristic, the image of the head has a characteristic that the head shape at the time when the helmet is worn is made rounded with bright clarity, as compared to the head shape at the time when the helmet is not worn. Further, as another characteristic, the image of the head has a characteristic that the head shape at the time when the helmet is worn is fixed through a time-series, and on the other hand, the head shape at the time when the helmet is not worn is not fixed when hair swings in the wind. The image characteristics of the above-described characteristics are previously learnt by using HOG characteristics, luminance gradient characteristics (direction characteristics), CCS characteristics, and Haar like characteristics, and by using Support Vector Machine, Generalized Learning Vector Quantization, AdaBoost, Real AdaBoost, and pseudo Bayes identification as a statistical identification method. Further, the image characteristics are registered in the helmet wearing determination dictionary 29.

Further, by using the helmet wearing determination dictionary 29, the helmet wearing determination unit 25 determines whether the image characteristics of the rider head region have a resemblance to either of the image characteristics at the time when the helmet is worn and the image characteristics at the time when the helmet is not worn. Further, the helmet wearing determination unit 25 determines on the basis of the above whether or not the person who rides on the two-wheel vehicle of the image wears the helmet.

By using the helmet wearing determination dictionary 29 in which the above-described characteristics are stored, for example, on the basis of the image characteristics of the head of the rider head region, in the case where it can be detected that a straight line is generated in a form crossing a face in a relatively upper portion of the central head, it is determined that the helmet is worn. On the other hand, in the case where it cannot be detected that a straight line is generated in a form crossing a face in a relatively upper portion of the central head, it is determined that the helmet is not worn.

By using the helmet wearing determination dictionary 29 in which the above-described characteristics are stored, on the basis of the image characteristics of the head of the rider head region, in the case where it can be detected that the head shape is made rounded with bright clarity, it is determined that the helmet is worn. On the other hand, in the case where it cannot be detected that the head shape is made rounded with bright clarity, it is determined that the helmet is not worn.

Further, by using the helmet wearing determination dictionary 29 in which the above-described characteristics are stored, on the basis of the image characteristics of the head of the rider head region, in the case where it can be detected that a change in a time-series is fixed, it is determined that the helmet is worn. On the other hand, in the case where it cannot be detected that a change in time-series is fixed, it is determined that the helmet is not worn.

The reporting device 3 has a display unit 30 that displays the image of the imaging device 1, and reports determination results of the helmet wearing determination unit 25 to a monitor.

Figure 8:
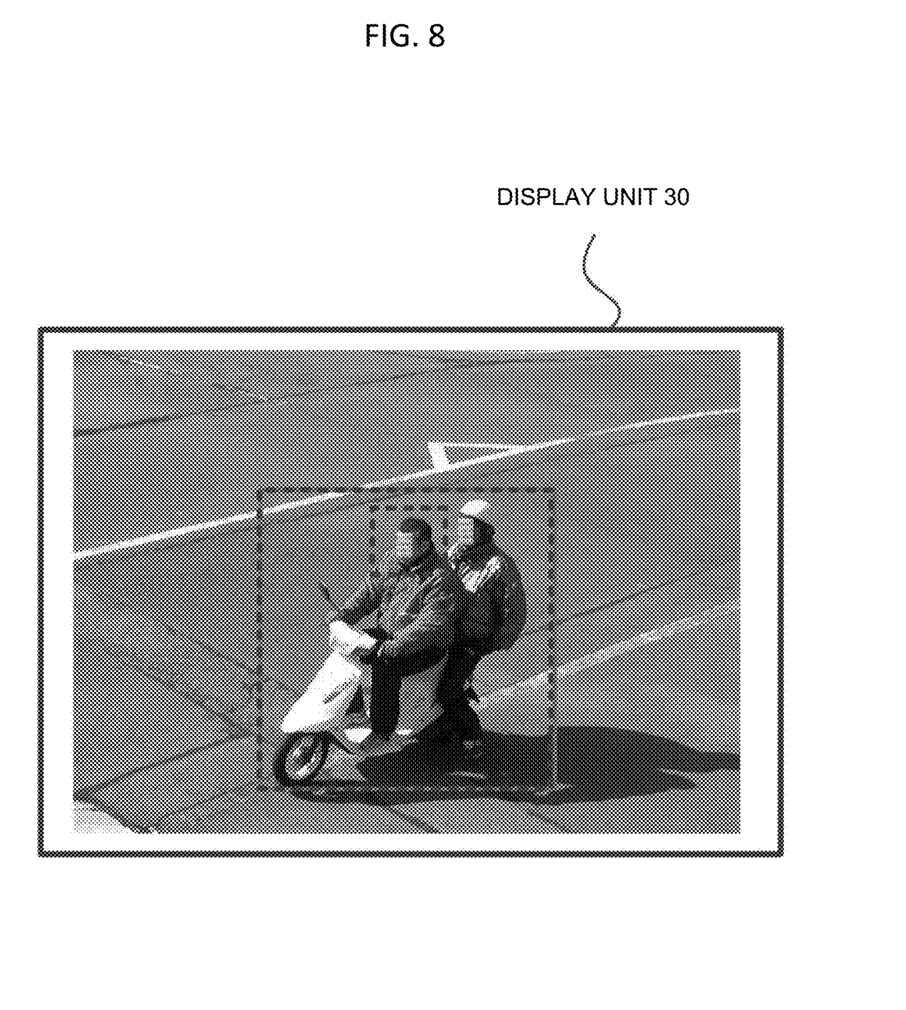
FIG. 8 illustrates the embodiment of the present invention.

The reporting device 3 receives the determination results of the helmet wearing determination unit 25, coordinates of the region surrounding the rider and the two-wheel vehicle body from the vehicle body position detection unit 23, and coordinates of the rider head region from the rider head region estimation unit 24. Further, as illustrated in FIG. 8, the image of the imaging device 1 is displayed on the display unit 30, and at the same time, in the case where the determination results of the helmet wearing determination unit 25 are that the rider does not wear the helmet, a graphic enclosing a region including at least the two-wheel vehicle body and the rider head is displayed on the image and a graphic enclosing the rider head region is displayed thereon.

Further, the characteristics of the rider (for example, a driver) may be displayed to be easily understood (for example, enlarged). Examples of the characteristics of the rider (for example, the driver) include a face, clothes, a bicycle (a color, a type of bicycles, conversion, etc.), and the like. By using a technology of facial recognition or object recognition, the above characteristics are recognized from the image, the recognized portion is segmented from the image, and the segmented image is largely displayed separately from the image as illustrated in FIG. 8 (for example, a face of the driver is largely displayed). Through the above display, the characteristics of the rider (for example, the driver) can be grasped.

Further, in combination with a person collation system or an object collation system, the above-described recognized characteristics (for example, a face, clothes, a color of bicycles, a type of bicycles, conversion, etc.) may be collated with information about the person collation system or information about the object collation system, and collation results may be displayed. Examples of the collation results include information about criminal records, a maker of clothes, a type of bicycles/conversion contents, and the like. Through the above configuration, the reporting device 3 can be also used for prevention or exposure of criminals.

According to the present embodiment configured as described above, it can be determined whether or not the person who rides on the two-wheel vehicle wears the helmet, without necessity to recognize a face of the person who rides on the two-wheel vehicle.

Further, in the case where the person who rides on the two-wheel vehicle does not wear the helmet, the two-wheel vehicle and the head on which the helmet is not worn are displayed so as to be recognized, and therefore awareness of the monitor can be promoted.

Further, in the two-wheel vehicle riding person number determination apparatus 2, the helmet wearing determination unit 25 may include an infrared detection unit (not illustrated). The infrared detection unit may be, for example, an infrared sensor. On the basis of detection results of infrared rays from the infrared detection unit, for example, the helmet wearing determination unit 25 may determine whether or not the helmet is worn. Alternatively, the helmet wearing determination unit 25 may impose a weight on comparison results of the above-described image characteristics on the basis of the detection results of infrared rays, and determine whether or not the helmet is worn. By including the infrared detection unit, the helmet wearing determination unit 25 can determine with higher accuracy whether or not the helmet is worn.

In the embodiment as described above, the two-wheel vehicle riding person number determination apparatus 2 is configured by hardware, and can be configured also by programs for making an information processing device execute the above-described operations. In this case, a processor that is operated by programs stored in a program memory implements functions and/or operations similar to those in the embodiments described above. Moreover, only part of functions of the embodiments described above may be implemented by a computer program.

Further, in the embodiment as described above, a determination object is described as the two-wheel vehicle. Further, when the head of the person can be detected, the determination object is not limited to the two-wheel vehicle. Of course, the present invention is applicable also to a one-wheel vehicle, a three-wheel vehicle, and others.

Moreover, part or all of the preceding embodiments may be described as in the following Supplementary Notes, although not limited thereto.

[Supplementary Note 1] A helmet wearing determination system comprising:
an imaging means that is installed in a predetermined position and images a two-wheel vehicle that travels on a road; and
a helmet wearing determination means that processes an image imaged by the imaging means, estimates a rider head region corresponding to a head of a person who rides on the two-wheel vehicle that travels on the road, compares image characteristics of the rider head region with image characteristics according to the head at a time when a helmet is worn or/and at a time when a helmet is not worn, and determines whether or not the rider wears the helmet.

[Supplementary Note 2] The helmet wearing determination system according to Supplementary Note 1, wherein
the helmet wearing determination means compares the image characteristics of the rider head region with the image characteristics that are previously learnt and stored, according to the head at the time when the helmet is worn or/and at the time when the helmet is not worn, and determines whether or not the rider wears the helmet.

[Supplementary Note 3] The helmet wearing determination system according to Supplementary Note 1 or 2, wherein
the rider head region estimation means specifies a position of the two-wheel vehicle from the image, and estimates the rider head region from the image region in an upper position of the specified two-wheel vehicle.

[Supplementary Note 4] The helmet wearing determination system according to any one of Supplementary Notes 1 to 3, further comprising a reporting means that reports determination results of the helmet wearing determination means.

[Supplementary Note 5] The helmet wearing determination system according to Supplementary Note 4, wherein
when the determination results of the helmet wearing determination means are that the helmet is not worn, the reporting means reports the determination results.

[Supplementary Note 6] The helmet wearing determination system according to Supplementary Note 5, wherein
the reporting means has a display means that displays the image, and
displays a graphic enclosing a region including at least a two-wheel vehicle body and the rider head specified by the rider head region estimation means on the image when the determination results of the helmet wearing determination means are that the helmet is not worn.

[Supplementary Note 7] The helmet wearing determination system according to any one of Supplementary Notes 1 to 6, wherein
the imaging means is installed in a position in which the two-wheel vehicle can be imaged in a range from an obliquely front side up to a lateral side with respect to a traveling direction of the two-wheel vehicle.

[Supplementary Note 8] The helmet wearing determination system according to any one of Supplementary Notes 1 to 7, wherein
the imaging means is installed short of a spot in which the two-wheel vehicle decelerates.

[Supplementary Note 9] A helmet wearing determination method, comprising the steps of:
processing an image of a imaging device that images a road, estimating a rider head region corresponding to a head of a person who rides on a two-wheel vehicle that travels on the road, comparing image characteristics extracted from the rider head region with image characteristics according to the head at a time when a helmet is worn or/and at a time when a helmet is not worn, and determining whether or not the rider wears the helmet.

[Supplementary Note 10] The helmet wearing determination method according to Supplementary Note 9, wherein
the image characteristics according to the head at the time when the helmet is worn or/and at the time when the helmet is not worn are previously learnt.

[Supplementary Note 11] The helmet wearing determination method according to Supplementary Note 9 or 10, wherein
a position of the two-wheel vehicle from the image is specified, and
the rider head region is estimated from the image region in an upper position of the specified two-wheel vehicle.

[Supplementary Note 12] The helmet wearing determination method according to any one of Supplementary Notes 9 to 11, further comprising the step of reporting the determination results.

[Supplementary Note 13] The helmet wearing determination method according to Supplementary Note 12, wherein
when the determination results are that the helmet is not worn, the determination results are reported.

[Supplementary Note 14] The helmet wearing determination method according to Supplementary Note 13, wherein when the determination results are that the helmet is not worn, a graphic enclosing a region including at least the two-wheel vehicle body and the rider head is displayed on the image and the determination results are reported.

[Supplementary Note 15] The helmet wearing determination method according to any one of Supplementary Notes 9 to 14, wherein
the two-wheel vehicle is imaged in a range from an obliquely front side up to a lateral side with respect to a traveling direction of the two-wheel vehicle.

[Supplementary Note 16] The helmet wearing determination method according to Supplementary Note 15, wherein
the two-wheel vehicle is imaged short of a spot in which the two-wheel vehicle decelerates.

[Supplementary Note 17] A helmet wearing determination apparatus, comprising:
a helmet wearing determination means that processes an image of a imaging device that images a road, estimates a rider head region corresponding to a head of a person who rides on a two-wheel vehicle that travels on the road, compares image characteristics of the rider head region with image characteristics according to the head at a time when a helmet is worn or/and at a time when a helmet is not worn, and determines whether or not the rider wears the helmet.

[Supplementary Note 18] A program for causing a computer to execute: a process of processing an image of an imaging device that images a road and estimating a rider head region corresponding to a head of a person who rides on a two-wheel vehicle that travels on the road; and
a process of comparing image characteristics of the rider head region with image characteristics according to the head at a time when a helmet is worn or/and at a time when a helmet is not worn and determining whether or not the rider wears the helmet.

Each embodiment as described above is a mere preferable embodiment of the present invention and thus the present invention will not be limited only to the embodiment. It is possible to carry out the present invention with various changes and modifications without departing from the spirit and scope of the invention.

The present application claims priority based on Japanese Patent Application No. 2013-239598 filed on Nov. 20, 2013, disclosure of which is incorporated herein in its entirety.

REFERENCE SIGNS LIST

1 Imaging device
2 Helmet wearing determination apparatus
3 Reporting device
21 Mobile object detection unit
22 Category classification unit
23 Vehicle body position detection unit
24 Rider head region estimation unit
25 Helmet wearing determination unit
26 Category determination dictionary
27 Vehicle body detection dictionary
28 Rider head region estimation dictionary
29 Helmet wearing determination dictionary
30 Display unit

The invention claimed is:

1. A helmet wearing determination system, comprising:
at least one memory storing instructions; and
at least one processor executing the instructions to perform:
specifying a two-wheel vehicle from an image;
detecting a range according to a vehicle body of the two-wheel vehicle;
estimating a rider head region from a shape of a contour of a valley portion in an upper region of the vehicle body in the image, the rider head region estimated to be a head of a rider; and
determining whether the rider wears a helmet based on image characteristics of the rider head region.

2. The helmet wearing determination system according to claim 1, wherein the at least one processor performs:
specifying the two-wheel vehicle from the image by using image characteristics that two circles are aligned.

3. The helmet wearing determination system according to claim 1, wherein the at least one processor performs:
specifying a horizontal width according to the vehicle body on the basis of a length between two wheels of the two-wheel vehicle, and specifying a vertical width according to the vehicle body on the basis of a length in a longitudinal direction of a wheel of the two-wheel vehicle.

4. The helmet wearing determination system according to claim 1, wherein the at least one processor performs:
determining whether or not the rider wears the helmet on the basis of detection results of infrared rays from an infrared sensor.

5. The helmet wearing determination system according to claim 1, wherein the detecting the range comprises detecting the range according to the vehicle body of the two-wheel vehicle, wherein the range according to the vehicle body of the two-wheel vehicle is specified by specifying a horizontal width according to the vehicle body on the basis of a length between two wheels of the two-wheel vehicle, and specifying a vertical width according to the vehicle body on the basis of a length in a longitudinal direction of a wheel of the two-wheel vehicle.

6. A helmet wearing determination method performed by a computer and comprising:
specifying a two-wheel vehicle from an image;
detecting a range according to a vehicle body of the two-wheel vehicle;
estimating a rider head region from a shape of a contour of a valley portion in an upper region of the vehicle body in the image, the rider head region estimated to be a head of a rider; and
determining whether the rider wears a helmet based on image characteristics of the rider head region.

7. The helmet wearing determination method according to claim 6, comprising:
specifying the two-wheel vehicle from the image by using image characteristics that two circles are aligned.

8. The helmet wearing determination method according to claim 6, comprising:
specifying a horizontal width according to the vehicle body on the basis of a length between two wheels of the two-wheel vehicle, and specifying a vertical width according to the vehicle body on the basis of a length in a longitudinal direction of a wheel of the two-wheel vehicle.

9. The helmet wearing determination method according to claim 6, comprising:
determining whether or not the rider wears the helmet on the basis of detection results of infrared rays from an infrared sensor.

10. The helmet wearing determination method according to claim 6, wherein the detecting the range comprises detecting the range according to the vehicle body of the two-wheel vehicle, wherein the range according to the vehicle body of the two-wheel vehicle is specified by specifying a horizontal width according to the vehicle body on the basis of a length between two wheels of the two-wheel vehicle, and specifying a vertical width according to the vehicle body on the basis of a length in a longitudinal direction of a wheel of the two-wheel vehicle.

11. A non-transitory recording medium storing a program for causing a computer to execute:
  specifying a two-wheel vehicle from an image;
  detecting a range according to a vehicle body of the two-wheel vehicle;
  estimating a rider head region from a shape of a contour of a valley portion in an upper region of the vehicle body in the image, the rider head region estimated to be a head of a rider; and
  determining whether the rider wears a helmet based on image characteristics of the rider head region.

12. The non-transitory recording medium according to claim 11, wherein
  the program causes the computer to execute:
    specifying the two-wheel vehicle from the image by using image characteristics that two circles are aligned.

13. The non-transitory recording medium according to claim 11, wherein
  the program causes the computer to execute:
    specifying a horizontal width according to the vehicle body on the basis of a length between two wheels of the two-wheel vehicle, and specifying a vertical width according to the vehicle body on the basis of a length in a longitudinal direction of a wheel of the two-wheel vehicle.

14. The non-transitory recording medium according to claim 11, wherein
  the program causes the computer to execute:
    determining whether or not the rider wears the helmet on the basis of detection results of infrared rays from an infrared sensor.

15. The non-transitory recording medium according to claim 11, wherein the detecting the range comprises detecting the range according to the vehicle body of the two-wheel vehicle, wherein the range according to the vehicle body of the two-wheel vehicle is specified by specifying a horizontal width according to the vehicle body on the basis of a length between two wheels of the two-wheel vehicle, and specifying a vertical width according to the vehicle body on the basis of a length in a longitudinal direction of a wheel of the two-wheel vehicle.

* * * * *